United States Patent
Chandler et al.

(10) Patent No.: US 12,541,942 B2
(45) Date of Patent: Feb. 3, 2026

(54) UTILITY POLE PIXEL MASKS

(71) Applicant: IKEGPS Group Limited, Wellington (NZ)

(72) Inventors: Trevor Edwin Chandler, Thornton, CO (US); Jeremy James Gold, Wellington (NZ)

(73) Assignee: IKEGPS Group Limited, Wellington (NZ)

( * ) Notice: Subject to any disclaimer, the term of this patent is extended or adjusted under 35 U.S.C. 154(b) by 517 days.

(21) Appl. No.: 18/145,664

(22) Filed: Dec. 22, 2022

(65) Prior Publication Data

US 2023/0196709 A1    Jun. 22, 2023

Related U.S. Application Data

(60) Provisional application No. 63/292,744, filed on Dec. 22, 2021.

(51) Int. Cl.
*G06V 10/20* (2022.01)
*G06V 10/26* (2022.01)
*G06V 10/75* (2022.01)

(52) U.S. Cl.
CPC .......... *G06V 10/255* (2022.01); *G06V 10/267* (2022.01); *G06V 10/751* (2022.01)

(58) Field of Classification Search
CPC ... G06V 10/267; G06V 10/255; G06V 10/751
See application file for complete search history.

(56) References Cited

U.S. PATENT DOCUMENTS

| | | | | |
|---|---|---|---|---|
| 2020/0356812 A1* | 11/2020 | Oleynik | ............... | H04N 13/246 |
| 2023/0123658 A1* | 4/2023 | Liu | ....................... | G06N 3/0455 |
| | | | | 345/629 |
| 2023/0135985 A1* | 5/2023 | Sugawara | ............ | B60W 40/06 |
| | | | | 701/1 |

FOREIGN PATENT DOCUMENTS

| | | | |
|---|---|---|---|
| CN | 102289833 A | | 12/2011 |
| CN | 109300118 A | | 2/2019 |
| CN | 112529287 A | | 3/2021 |
| JP | 2020-065330 A | | 4/2020 |

* cited by examiner

*Primary Examiner* — David Perlman
(74) *Attorney, Agent, or Firm* — Merchant & Gould P.C.

(57) ABSTRACT

A method is disclosed for creating a precision mask for a utility pole and/or pole hardware ("utility pole") depicted in a digital image. The utility pole is detected within a digital image comprising a plurality of pixels. An initial pixel mask is then created for the utility pole and determining a color range. The plurality of pixels is then processed within the digital image, wherein: the color of each pixel is sampled, and each pixel is included or excluded from the precision mask based at least partially on its sampled color and the color range; and outputting the precision mask. Other disclosed methods provide for identification of a class of utility pole depicted in a digital image by comparison to a plurality of 3D models. Still other disclosed methods may be used to predict the height of a utility pole depicted in a digital image.

24 Claims, 15 Drawing Sheets
(2 of 15 Drawing Sheet(s) Filed in Color)

Summary
- Base: Mean = 0.29m, RMS Error = 0.35
- Tip: Mean = -0.21m, RMS Error = 0.32

Summary
- Base: Mean = 0.09m, RMS Error = 0.23
- Tip: Mean = 0.04m, RMS Error = 0.21

UTILITY POLE PIXEL MASKS

CROSS-REFERENCE TO RELATED APPLICATIONS

This application claims priority to U.S. Provisional Patent Application No. 63/292,744, filed 22 Dec. 2021, the entire contents of which are hereby incorporated by reference.

FIELD

This invention relates to measuring utility poles and utility pole hardware.

BACKGROUND

Municipalities maintain a number of utility poles. Utility poles require regular monitoring and measuring by trained operators in the field. This can require a substantial amount of labor and resources.

SUMMARY

According to one example there is provided a method for creating a precision mask for a utility pole and/or pole hardware depicted in a digital image, the method comprising: accessing a digital image comprising a plurality of pixels, detecting the utility pole and/or pole hardware within the digital image, creating an initial pixel mask for the utility pole and/or pole hardware, determining a color range, processing the plurality of pixels within the digital image, wherein: the color of each pixel is sampled, and each pixel is included or excluded from the precision mask based at least partially on its sampled color and the color range; and outputting the precision mask.

Examples may be implemented according to any one of the dependent claims 2 to 9.

According to a further example there is provided a method of identifying a class of a utility pole and/or pole hardware depicted in a digital image, the method comprising: accessing the digital image comprising a plurality of pixels, creating a pixel mask for the utility pole and/or pole hardware, accessing a plurality of 3D models, wherein each 3D model corresponds to a class of utility poles and/or pole hardware, comparing each 3D model with the pixel mask, and identifying the class of utility pole and/or pole hardware based at least partially on the comparison.

Examples may be implemented according to any one of the dependent claims 11 to 15.

According to a further example there is provided a method of predicting the height of a utility pole depicted in a digital image, the method comprising: accessing the digital image, identifying the utility pole within the digital image, receiving metadata, providing the metadata and digital image to a trained machine learning model, and predicting the height of the utility pole using the trained machine learning model.

Examples may be implemented according to any one of the dependent claims 17 to 23.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The patent or application filed contains at least one drawing executed in color. Copies of this patent or patent application publication with color drawing(s) will be provided by the Office upon request and payment of the necessary fee. The accompanying drawings which are incorporated in and constitute part of the specification, illustrate examples of the invention and, together with the general description of the invention given above, and the detailed description of examples given below, serve to explain the principles of the invention, in which.

DETAILED DESCRIPTION

Large numbers of utility poles are maintained by municipalities and other entities around the world. Part of this maintenance typically requires ongoing monitoring and measurements of the utility poles. This is usually done by trained operators in the field, which can be expensive and labor-intensive. Costs could be saved if image processing and artificial intelligence techniques allowed for measurement and monitoring of utility poles from digital images.

The applicant has found that utility pole pixel data can be used to make accurate measurements from digital images, particularly using trained machine learning models. The utility pole pixel data comprises the pixels of the digital image that are identified as belonging to the utility pole. These pixels are known as a pixel mask. The accuracy of measurements and predictions that are made using the utility pixel data depends on the accuracy of the pixel mask—in other words, whether the pixel mask accurately includes all pixels in the image that belong to the utility pole (the 'ground truth') and whether the pixel mask accurately excludes all pixels that do not belong to the utility pole.

Whilst there are known techniques for creating pixel masks of utility poles from digital images, the applicant has found that these pixel masks are often insufficiently accurate. The pixel masks can erroneously include pixels that do not actually belong to the utility pole and/or erroneously exclude pixels that do belong to the utility pole.

The methods and models discussed herein can be implemented by instructions on a computing device, such as an electronic computing device. These can constitute a computer program that is embodied in various media, including tangible or non-tangible media, transitory or non-transitory media and can run on any suitable device. There can also be provided instructions for outputting data to a display device and for producing a user interface (UI) on the computing device or another computing device.

Figure 1:
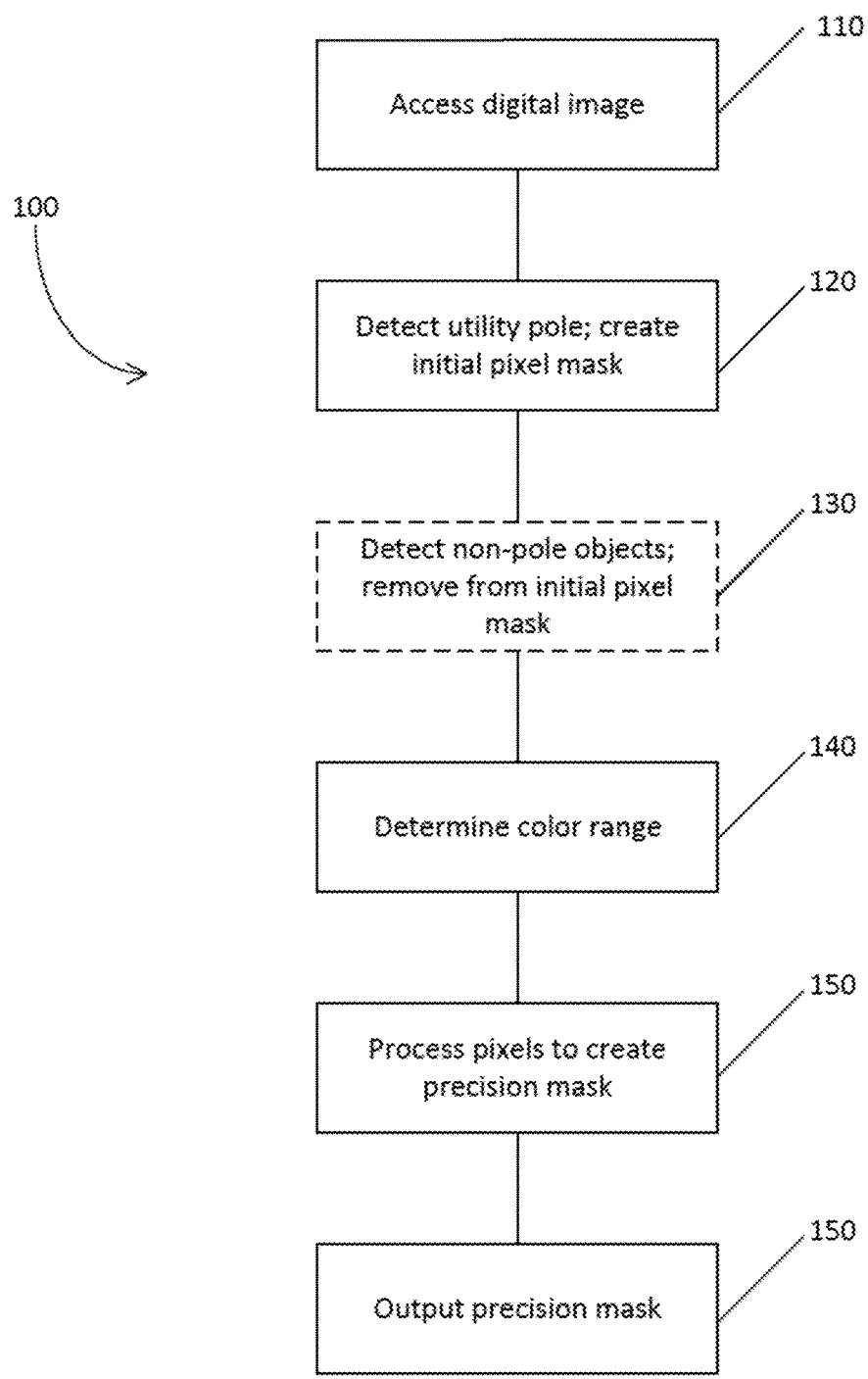
FIG. 1 is an example of a method of creating a precision mask.

FIG. 1 depicts an example of a method of creating a precision mask for a utility pole. A digital image depicting the utility pole is accessed at 110. The digital image comprises a plurality of pixels and is typically a 2D image, and preferably a color image. The digital image preferably depicts the entire utility pole including its top and bottom (typically the point at which the utility pole is sunk or buried into the ground.) It is not uncommon for the depicted utility pole to be partially obscured by pole hardware or other non-pole objects, such as street signs, birds' nests, or other objects that can typically be found in the vicinity of utility poles.

One or more algorithms are used to detect the utility pole within the digital image at 120 and an initial pixel mask is created for the utility pole. The initial pixel mask is a set of pixels within the digital image that are identified as belonging to the detected utility pole. A bounding box may also be generated to indicate the topmost and bottommost pixels of the initial pixel mask.

The initial pixel mask can be generated using one or more object detection techniques. For example, a neural network can be configured to instance segment the digital image, identify the utility pole, and to mark the pixels that are identified as belonging to the utility pole. Instance segmentation can be particularly beneficial because the digital image accessed at 110 may include multiple utility poles or multiple pieces of pole hardware. Separating and identifying the unique utility poles and/or instances of pole hardware depicted in the digital image allows for the use of syntactic rules.

Instance segmentation can alternatively or additionally be performed after the use of one or more initial object techniques, such as bounding box detection, in order to create a more refined initial mask. Alternatively, the initial mask for the utility pole may be created at 120 without the use of instance segmentation. Other examples may use semantic segmentation, bounding box detection, or other object detection methods.

The initial pixel mask will typically exclude pixels that actually belong to the utility pole and/or include pixels that do not belong to the utility pole. The differences between the initial pixel mask and the ground truth pixels can determine how the initial pixel mask is further processed. It can therefore be useful to consistently produce initial pixel masks that are either too 'small' (i.e. exclude some pole pixels but do not include any non-pole pixels) or are too 'large' (i.e. include all pole pixels but include some non-pole pixels) to help ensure that further processing of the initial pixel mask is also consistent.

Any non-pole objects such as pole hardware (e.g. transformers) may also be identified when the initial mask for the utility pole is created at 120. For instance, the digital image may be instance segmented in a way that uniquely identifies the pole and also uniquely identifies non-pole objects, such as pole hardware, that obscure the pole.

Non-pole objects can alternatively be identified during subsequent object detection following the initial detection of the utility pole, as at 130. For example, a neural network particularly suited to detect or segment pole hardware that commonly obscures the pole itself may be used to accurately detect non-pole objects within the digital image. In some examples, the detection of non-pole objects may be restricted to the area circumscribed by the bounding box that may be initially created for the utility pole created at 110.

If one or more non-pole objects are detected and are found to obscure the utility pole, then they can be removed from the pixel mask at 130. Non-pole objects can also optionally be detected and removed using syntactic rules. If the removal of any non-pole object interrupts an edge or creates a gap within the initial mask of the utility pole, then the gap or interrupted edge may be inferred and recreated or filled in using a predicted edge or predicted area. The predicted edge or area may be determined using an algorithm according to the properties of the non-pole object and/or the properties of the background of the digital image. Alternatively, a gap can be simply filled in some examples by drawing a line between the outermost pixels at the top and bottom of the gap.

After an initial mask for the utility pole has been created and any partially obscuring non-pole objects have been identified and/or removed from the initial mask, a color range is created or provided at 140. Pixels within the digital image and/or the initial pixel mask are then processed at 150 to produce a precision mask. The populated precision mask is then output at 160 for subsequent use.

The details of the color range creation and pixel processing can depend on the differences between the initial pixel mask (i.e. the set of pixels identified as the utility pole) and the ground truth pixels (i.e. the set of pixels that actually are the utility pole), as described below.

'Small' and 'Large' Initial Pixel Masks

As discussed, the initial pixel mask created at 120 can erroneously include pixels that do not actually belong to the utility pole and/or erroneously exclude pixels that do belong to the utility pole.

A 'small' initial pixel mask excludes some utility pole pixels but does not include a substantial number of non-pole pixels. In this case, the precision mask can be built up from the initial pixel mask by incorporating utility pole pixels whilst not including a substantial number of non-pole pixels. Conversely, a 'large' initial pixel mask includes all (or at least a substantial number of) utility pole pixels but also includes some number of non-pole pixels. In this case, the precision mask can be built up from the initial pixel mask by removing non-pole pixels from the initial mask.

Figure 2:
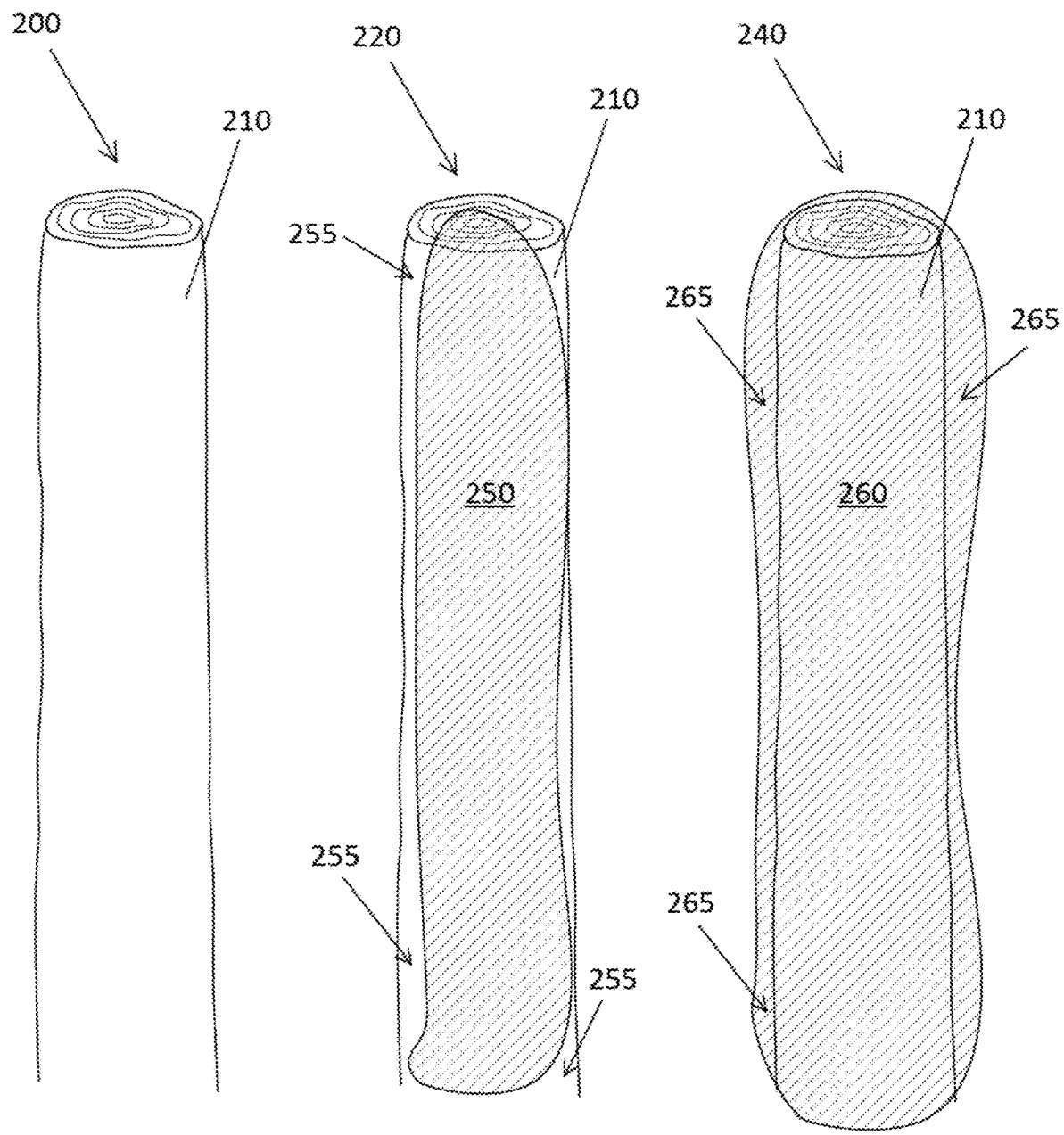
FIG. 2 illustrates a stylized example of a small pixel mask and large pixel mask.

FIG. 2 illustrates a stylized example of small and large pixel masks for a utility pole. A portion of a utility pole 210 that is depicted within a digital image is displayed at 200 without any initial pixel mask. A small pixel mask 250 (which is exaggerated in the figure for illustration) is overlaid on the utility pole 210 at 220. It can be seen that a portion of the pixels of the utility pole 210 (generally at the extremity of the utility pole 210) have not been included within the small pixel mask 250. This portion is generally indicated by 255.

A large pixel mask 260 (which is similarly exaggerated for illustration) is overlaid on the utility pole 210 at 240.

Although the large pixel mask includes all of the utility pole pixels in this example, it can be seen that a portion of non-pole pixels (generally indicated by 265) have been erroneously incorporated into the large pixel mask 260. The large pixel mask 260 exceeds the actual bounds of the utility pole 210 and therefore incorporates non-pole pixels.

It can be useful to configure the algorithm(s) used to create the initial mask so that they tend to consistently create small initial pixel masks or large initial pixel masks. For example, if a neural network is used to instance segment the digital image to produce an initial mask, the layers of the neural network can be configured to produce initial masks of an according size.

If a smaller initial mask is desired, the neural network may be configured so that its confidence threshold for the inclusion of a given pixel into the initial mask is set relatively high. This means that some pixels belonging to the utility pole will not be included in the initial mask. The initial mask may be unlikely to include any background pixels. Conversely, if a larger initial mask is desired, the neural network may be configured so that its threshold for the inclusion of a given pixel into the initial mask is set relatively low. The initial mask will likely include all pixels that do belong to the utility pole but will likely include some background pixels or non-pole pixels.

The neural network (or other algorithm(s) used to produce the initial mask can use a number of filters to determine which pixels should be included in the initial mask. These can include filters and/or layers for:
Colors
Sizes
Straight edges
Corners
Brightness
Contrast Any or all of these filters or layers may be adjusted or configured in order to set the desired confidence level and to achieve the desired initial mask. The number of units or nodes within a given layer may also or alternatively be adjusted.

Creating Precision Masks from Small Initial Pixel Masks

A small initial pixel mask excludes some utility pole pixels but does not include a substantial number of non-pole pixels. A precision mask can be constructed from the initial pixel mask by incorporating the excluded utility pole pixels whilst not incorporating a substantial number of non-pole pixels.

Figure 3:
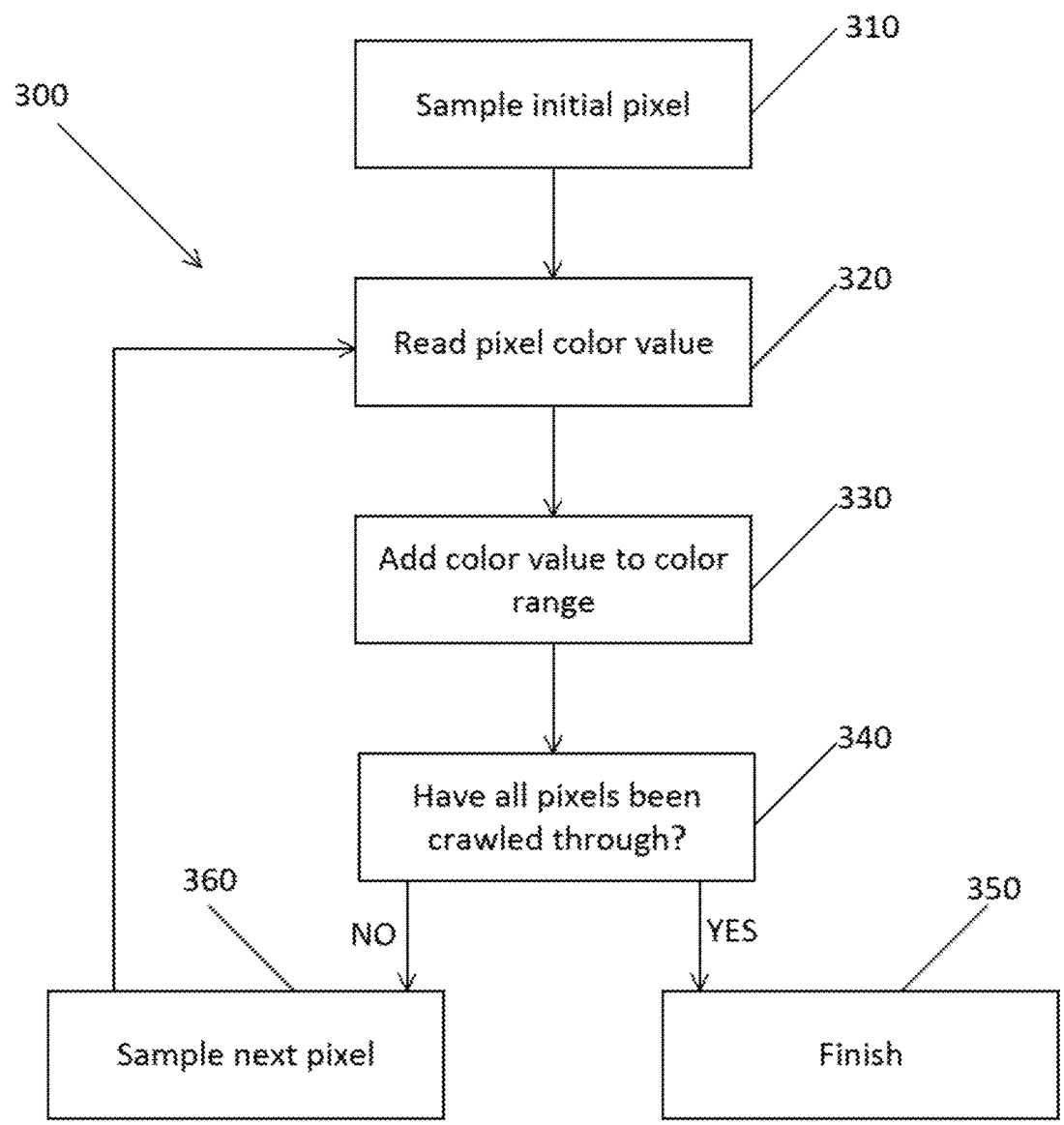
FIG. 3 depicts an example of a method for creating a color range.

FIG. 3 depicts an example of a method 300 for creating a color range for a small initial pixel mask. The method 300 is one example of how a color range can be created at 140 (with respect to FIG. 1). An initial pixel within the initial pixel mask is sampled at 310 and its color value is read at 320. The color value of the pixel is then added to the color range at 330 (if it is not included within the color range already). A check is made at 340 as to whether all pixels within the initial mask (or within a subset of the initial mask) have been sampled. If so, the method finishes at 350. Otherwise the next pixel is sampled at 360 and the process repeats at 320.

The produced color range is then a color space containing the colors of all pixels within the initial mask, excluding any pixels which have been subtracted from the initial mask and/or are ignored during the color sampling process (e.g. pixels corresponding to non-pole objects which have been identified and/or segmented, as described above.) In other examples, only a subset of the pixels (rather than all pixels) within the initial mask may be sampled, and/or a color range may be provided (as described below.)

Figure 4:
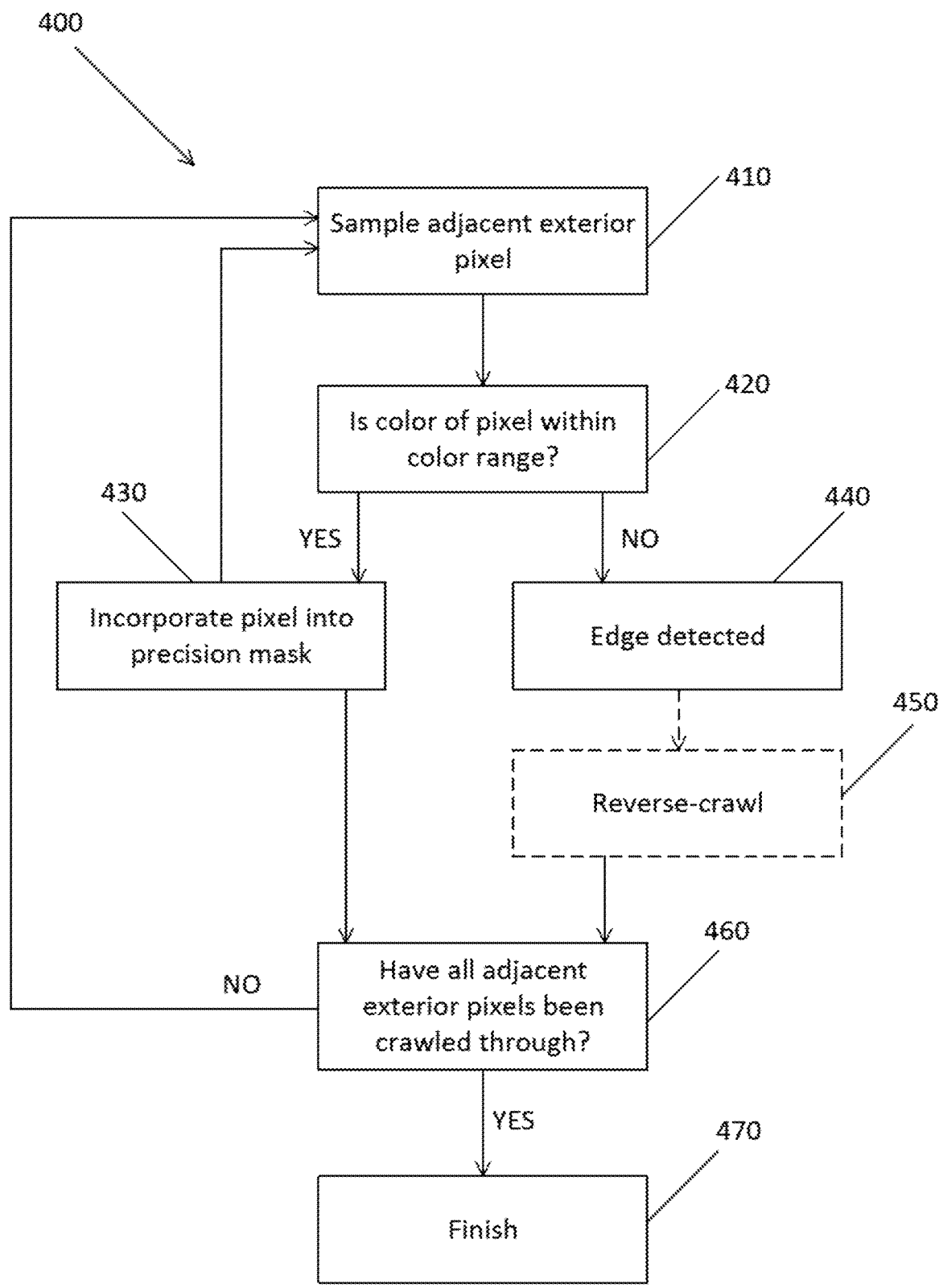
FIG. 4 depicts an example of a method for processing pixels to create a precision mask.

FIG. 4 depicts an example of a method 400 for processing pixels to create a precision mask. The method 400 is one example of how pixels can be processed at 150 (with respect to FIG. 1). The processing can happen simultaneously at each edge pixel of the initial pixel mask as it appears within the digital image. The color of a pixel immediately adjacent to and outside of the edge of the initial pixel mask is sampled at 410. A check is made at 420 as to whether the color of the sampled pixel is within the color range. If the color of the pixel is within the color range, then the pixel is incorporated into the precision mask at 430 and the next adjacent exterior pixel is sampled at 410. If the color of the pixel is outside of the color range, an edge is detected at 440. The crawling process can optionally reverse inwardly at 450 towards the initial mask when a pixel outside of the color range is encountered. The first pixel encountered during the reverse crawl that falls within the color range then defines a part of the outer limit of the precision mask.

A check is made at 460 as to whether all of the pixels adjacent to and exterior of the initial mask and/or the precision mask have been processed. Any remaining pixels are then processed at 410. The method finishes at 470 once all adjacent exterior pixels have been processed.

In this way, chains of adjacent pixels which border the initial mask of the utility pole and fall within the color range of the initial mask are progressively incorporated into the precision mask. This continues until an outer pixel is reached which has a color that is not within the color range (or is positively identified as a non-pole pixel) which can be used to find the edge of the precision mask.

The crawling process expands outwardly from each edge pixel of the initial mask both horizontally and vertically and ends once the boundaries of the precision mask have been established. The finished precision mask then represents a more accurate masking of the utility pole than was initially created at 110. At least a portion of the pixels that were erroneously excluded from the initial mask created at 110 are incorporated into the precision mask at 470 on the basis of their color values.

In this example, a sampled pixel is included in the precision mask if the color of the pixel is found to be within the color range that is determined or provided. In other examples, the color range may be used to identify non-pole pixels, and the check made at 420 may reject the sampled pixel if its color is found to be within a portion of the color range that corresponds to background pixels.

Figure 5:
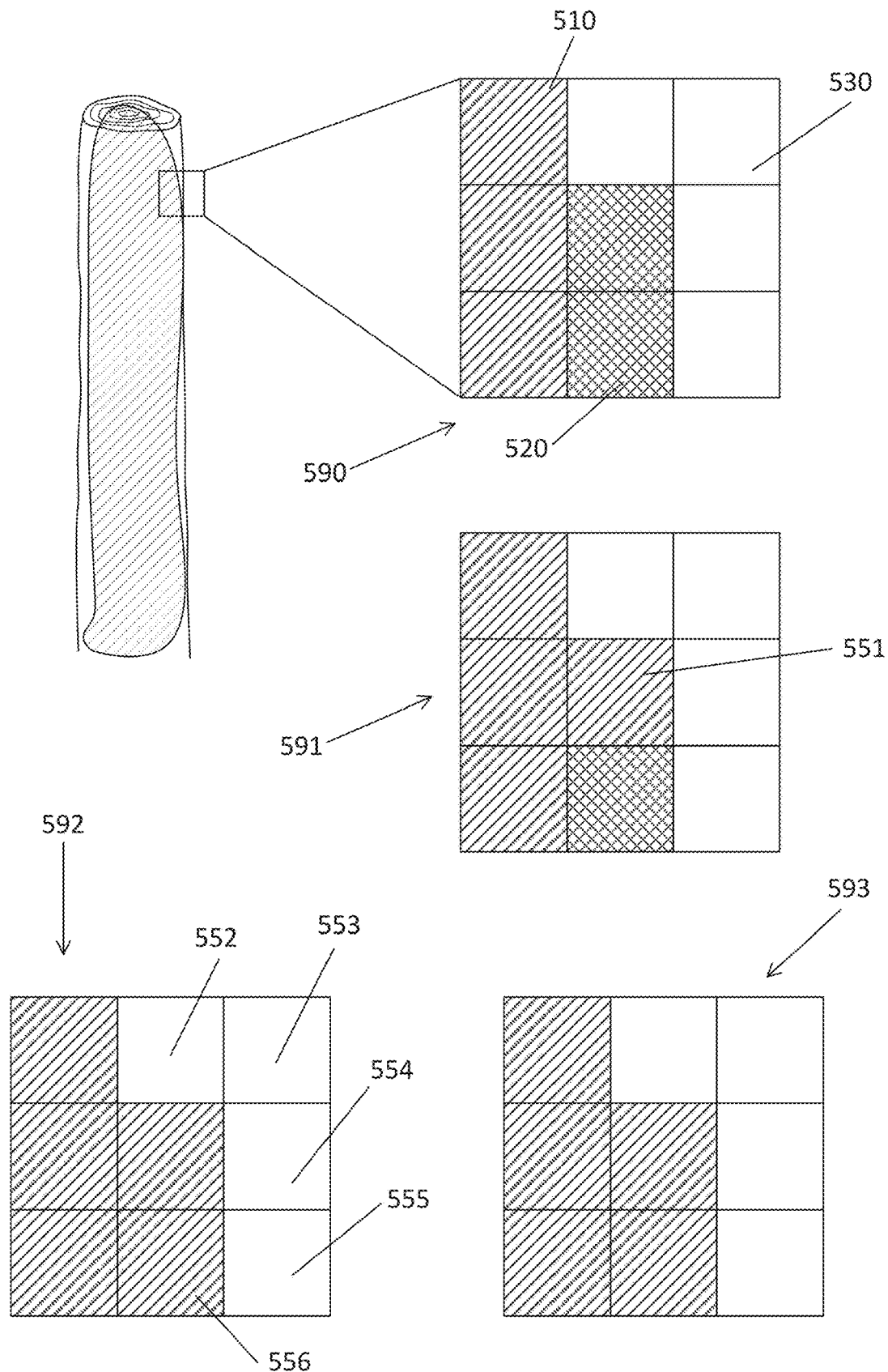
FIG. 5 shows a worked example of a method for processing pixels to create a precision mask.

FIG. 5 shows a worked example of a method for processing pixels to create a precision mask. A portion of an initial small pixel mask is shown at 590. Utility pole pixels that are included within the mask are shown by hatched lines and indicated 510. A number of pixels 520 (shown by cross-hatched lines) are utility pole pixels but are not included within the initial mask. A number of exterior pixels 530 are not utility pole pixels and are not within the initial mask.

Pixel 551 which is adjacent to and exterior to the initial mask is sampled at 591 (corresponding to 410 in FIG. 4). Its color is checked and it is incorporated into the precision mask on the basis of the color range. A check is made (corresponding to 460 in FIG. 4) as to whether all adjacent exterior pixels have been processed.

Adjacent pixels 552, 553, 554, 555, and 556 have not been processed, so their color values are sampled (corresponding to 410 in FIG. 4 for each pixel) at 592. Pixel 556 is incorporated into the precision mask as it is identified as a utility pole pixel on the basis of its color.

Non-pole pixels 552-555 are not incorporated into the precision mask as their colors do not fall within the color range, and therefore define the edge of the precision mask. The processing then ends with the precision mask shown at 593. The utility pole pixels 520 have been successfully incorporated into the precision mask whilst the background pixels 530 have not been incorporated into the precision mask.

Other Color Ranges

Although the color range can be populated by sampling all pixels within the initial mask, other examples may not sample all pixels. In some examples, the color range may be populated by sampling only a subset of the total pixels within the initial mask. This may increase the speed of the population of the color range, potentially at the risk of a decrease in accuracy in subsequent parts of the method. The fraction of pixels that are sampled from within the initial mask is preferably chosen such that the produced color range is representative of as many of the colors within the initial mask as possible. Preferably all colors that occur within the initial mask are represented within the color range.

In other examples, at least a portion of the color range may already be predetermined or externally provided. For example, if it is known beforehand that the utility pole is made of a certain material, a color range corresponding to most or all possible colors of that material may be chosen. In still further examples, some or all pixels within the mask may be sampled in order to determine whether there is any discrepancy or disagreement between the pre-determined color range and the color of the sampled pixels within the initial mask of the utility pole. This can have an advantage in that the pre-determined color range can include pixels that are likely to be part of the utility pole but are not included within the initial mask of the utility pole.

The color range can also include a range of colors that are identified as non-pole pixels. A non-pole color range can be populated from the digital image or can be predetermined. Predetermined non-pole color ranges can also be provided to supplement other color range containing utility pole pixels.

Large Initial Pixel Masks

A 'large' initial pixel mask includes all (or at least a substantial number of) utility pole pixels but also includes some number of non-pole pixels. In this case, the precision mask can be built up from the initial pixel mask by removing non-pole pixels from the initial mask.

A color range is used to determine which pixels should be removed from the precision mask. In one example, the color range may be initially acquired in substantially the same way as the color range for a small initial mask (such as, for example, the method depicted in FIG. 4). The color of each pixel (or a subset of pixels) within the mask may be sampled in order to build the color range. The color range can then be analyzed to determine whether there are any common groups of pixels within the initial mask that could represent utility pole pixels and non-pole pixels.

Figure 6A:
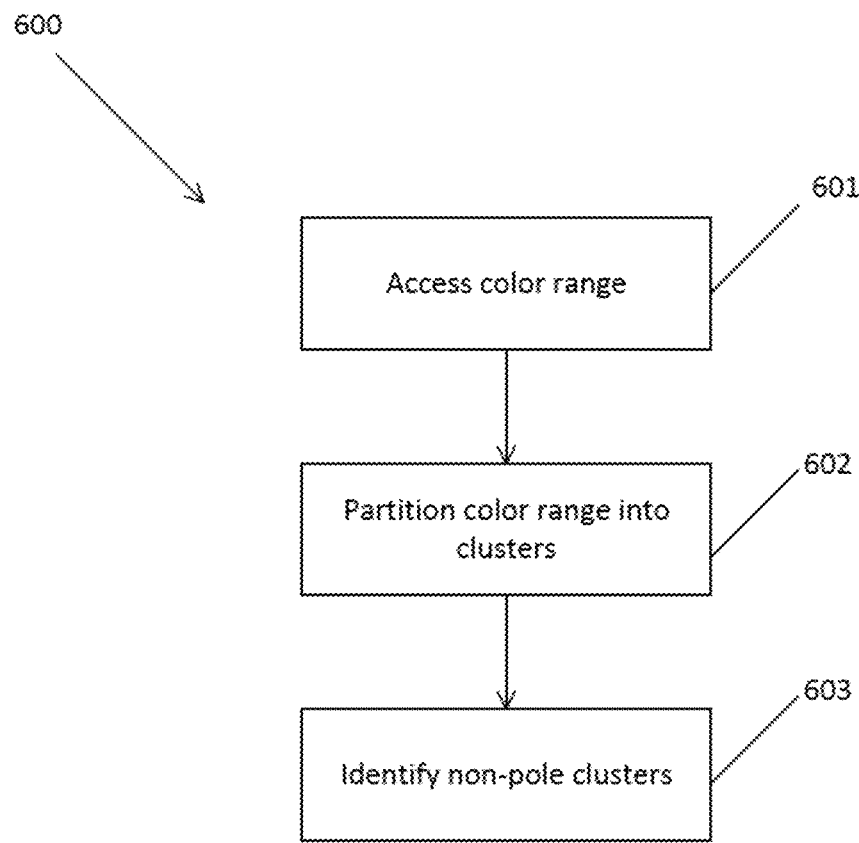
FIG. 6A shows an example of a method for determining a color range.

FIG. 6A shows an example of a method 600 for determining a color range for a large initial pixel mask. An initial color range is accessed at 601. This color range may be provided by sampling some or all of the pixels within the initial pixel mask as described above, and therefore may include a mixture of pole pixels and non-pole pixels. The initial color range (or color space corresponding to the initial color range) is then partitioned at 602 into utility pole pixels and non-pole pixels. For example, the color range may be partitioned into clusters. In one example, a k-means clustering algorithm is used to partition clusters within the color space.

Clusters of non-pole pixels (and/or clusters of utility pole pixels) are then identified at 603. A priori knowledge may be used to determine whether any of the identified clusters within the color space are known to correspond with pixels that should be excluded from the initial mask or are known to correspond with utility pole pixels. For example, an identified cluster of pixels may be located in a blue region of the color space. It may be known that this general area of the color space typically corresponds to pixels that belong to the sky depicted within a typical image. Alternatively or additionally, a trained machine learning model can review the partitioned/clustered color space to predict which pixels are likely to be utility pole pixels and which pixels are likely to be non-pole pixels.

In other examples, a similar approach may be taken without the use of a priori knowledge. For example, the color range may be partitioned into clusters and the number of pixels within each cluster may be compared. The largest cluster (corresponding to the pixels representing the majority of the initial mask) may be assumed to be the pixels belonging to the utility pole. These pixels can then be included during the subsequent processing (or alternatively, the pixels not within that cluster may be excluded during processing.)

In yet another example, the color space may be partitioned into different clusters. Several different permutations of a precision mask may be generated by iteratively treating each of the identified clusters within the color space as background pixels to be excluded (or as utility pole pixels to be included), either alone or in combination. The different permutations of the precision masks resulting from the various color ranges can then be compared against one another or otherwise validated to determine which precision mask is more likely to be correct. For example, an object detection algorithm (such as instance segmentation or semantic segmentation) may be used on each permutation of the precision mask. At least one permutation of the precision mask will include only background pixels. The validation classifier will likely determine that this mask does not depict a utility pole with a high level of confidence. The associated cluster(s) of pixels can then be identified as background pixels with a correspondingly high level of confidence.

Once any non-pole clusters of pixels are identified at 603, a precision mask can be generated by processing pixels within the initial pixel mask and/or other pixels within the digital image.

In some examples, the pixel processing may start from the interior of the initial mask and may progress outwards. For example, the precision mask may initially be empty or unpopulated at the beginning of the pixel crawling process. Pixels within or at the center of the initial mask may be sampled and included in the precision mask if their color value falls within the utility pole range of the color space defined within the color range. Pixels that are not within the utility pole range of the color space or fall within an identified background range of the color space, such as a background cluster within the color range—are not included in the precision mask. The crawling process continues outwardly from the center to adjacent pixels until the outer limits of the initial mask are reached. There is no need to crawl beyond the limits of the initial mask under the presumption that the initial mask includes the entirety of the actual utility pole in addition to one or more background or non-pole pixels that have erroneously been included in the initial mask. The end result is a precision mask of the utility pole that has been created using a 'bottom-up' approach to only include pixels which belong to the utility pole region of the color range.

Alternatively, the precision mask can be created using a 'top-down' approach. The precision mask may initially be equivalent to the initial mask at the beginning of the pixel crawling process. Pixels within or at the center of the initial mask may be sampled and may be excluded from the precision mask if they are identified as being background or non-pole pixels on the basis of the color range. The crawling process continues outwardly from the center towards the outer limits of the initial mask. The end result is a precision mask of the utility pole that excludes the background or non-pole pixels that were erroneously included in the initial mask.

Alternatively, the precision mask can be created using a top-down or bottom-up approach starting from the outer limits of the initial mask and crawling inwardly towards the center of the initial mask.

Combination of Approaches

Although the process used to create the precision mask has been described in terms of initial masks that are either too small or too large to accurately capture the utility pole, this is not intended to be limiting. A combination of approaches can be used. This can potentially increase the accuracy of the precision mask or may be used to validate the results of one approach.

Figure 6B:
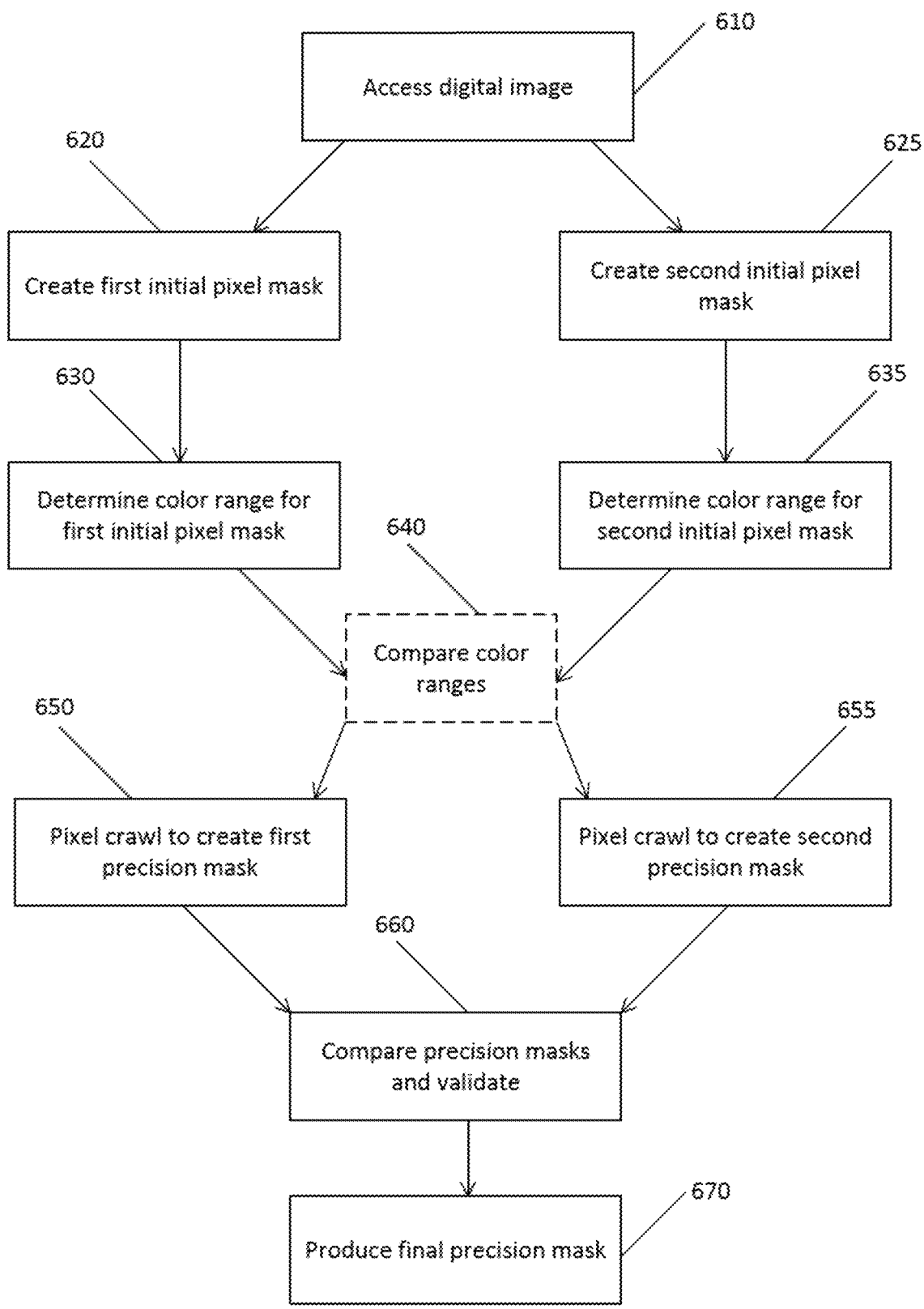
FIG. 6B depicts an example of a method for generating a precision mask.

FIG. 6B depicts an example of a method of generating a precision mask for a utility pole. A digital image is accessed at 610. A first initial mask is created at 620, whilst a complementary second initial mask is created at 625. The algorithm(s) used to create the first initial mask at 620 and complimentary second initial mask at 625 can be configured such that one of the two initial masks is generally smaller than the actual utility pole, whilst the other initial mask is generally larger than the actual utility pole. For example, the first initial mask created at 620 may be the smaller mask, whilst the complimentary second mask created at 625 may be the larger mask.

Two color ranges are then generated for each respective initial mask at 630 and 635 (although in other examples, a single color range may be used). The color ranges for the smaller and larger initial masks may be created using any of the methods described herein or may be provided externally. For example, for the first (smaller) initial mask, the pixels within the first mask (or a subset of pixels within the first mask) may be sampled to build up a color range at 630. All of the pixels may be included if the first mask is presumed to contain only a subset of the utility pole without any non-pole pixels. For the second (larger) initial mask, the pixels within the second mask (or a subset of pixels within the second mask) may be sampled to build up a color range at 635. The resulting color space may be segmented or clustered to identify background pixels and/or utility pole pixels. A priori knowledge may be used as described above.

The two color ranges created at 630 and 635 may also optionally be compared and contrasted against one another at 540. For example, the color range populated for the first initial mask at 630 may be used to validate that a cluster within the color space corresponding to the second color range (created at 635) does correspond to utility pole pixels.

A first precision mask can then be generated via pixel processing for the first initial mask at 650, whilst a second precision mask can be generated via pixel processing for the second initial mask at 655. Any of the pixel processing techniques described herein may be used as appropriate.

The two precision masks can then be compared against one another at 660 for validation. For example, either or both of the first initial pixel mask and second initial pixel mask may be assigned a score to determine which of the pixel masks is more accurate. A difference mask can also or alternatively be created from the two precision masks.

A final precision mask can then be produced at 670 on the basis of the comparison and/or validation at 660. The final precision mask may differ from the first initial pixel mask and second initial pixel mask if either of the precision masks created at 650 and 655 have been altered. Alternatively, the final precision mask may be the more accurate of the two precision masks created at 650 and 655.

Pixel Processing Using Intermediate Initial Masks

The initial mask for the utility pole has been described as either encompassing the entirety of the utility pole and a number of non-pole pixels, or encompassing only a subset of the utility pole without any background pixels (whilst possibly containing non-pole pixels that obscure the utility pole, such as pixels corresponding to pole hardware). However, the initial mask may occasionally include only a subset of the pixels corresponding to the utility pole and may also include some background pixels. This is referred to as an 'intermediate' pixel mask.

Figure 7:
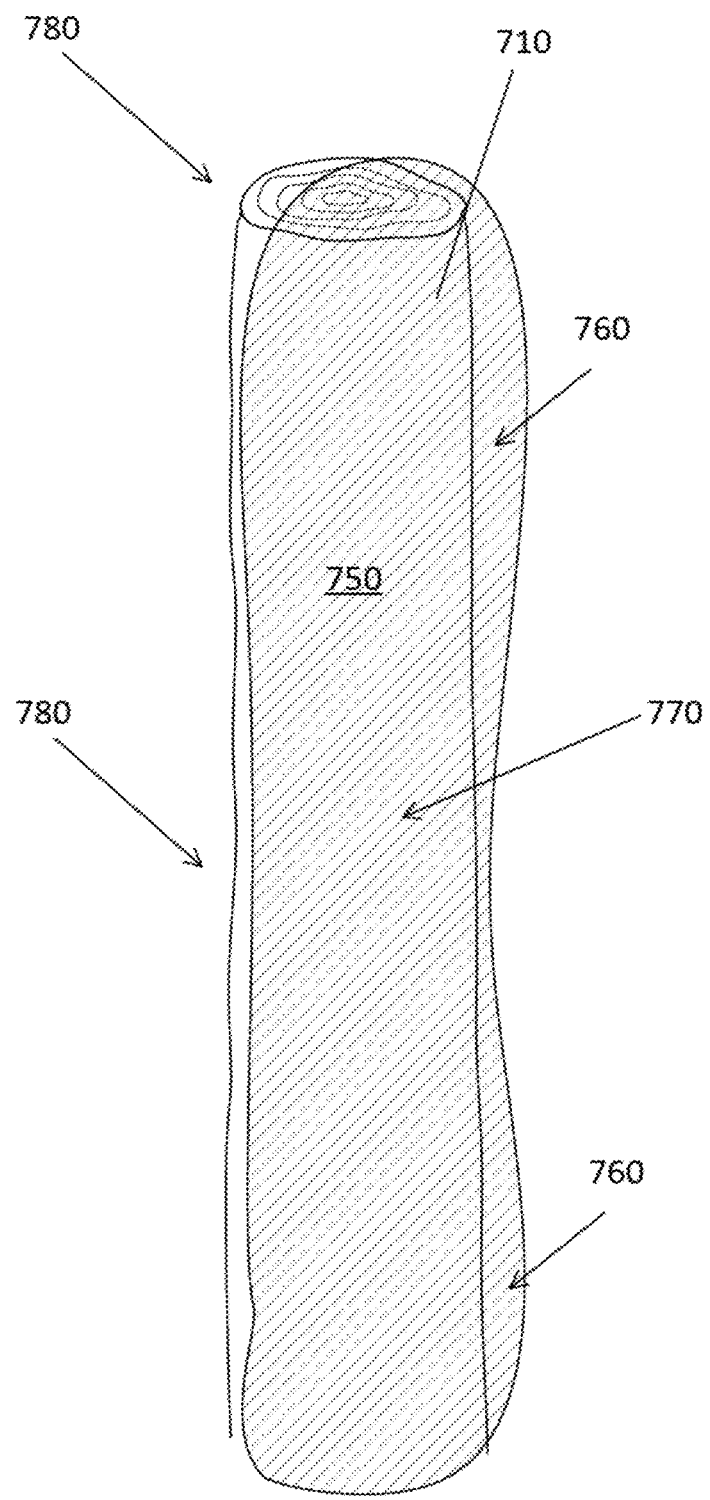
FIG. 7 illustrates a stylized example of an intermediate pixel mask.

FIG. 7 illustrates a stylized example of an intermediate pixel mask for a utility pole. A portion of a utility pole 710 that is depicted in a digital image is shown. The intermediate mask 750 (which is exaggerated in the figure for illustration) for the utility pole 710 is represented by hatched area 750. The intermediate mask includes an area of background pixels (generally indicated by 760) as well as pixels corresponding to the utility pole (generally indicated by 770). A portion of the utility pole pixels (generally indicated by 780) has not been captured by the intermediate mask 750.

A precision mask that is to be produced from the intermediate mask 750 therefore needs to exclude the background pixels 760 that were captured within the intermediate mask 750 whilst also including the utility pole pixels 780 that the initial mask 750 failed to capture.

Figure 8:
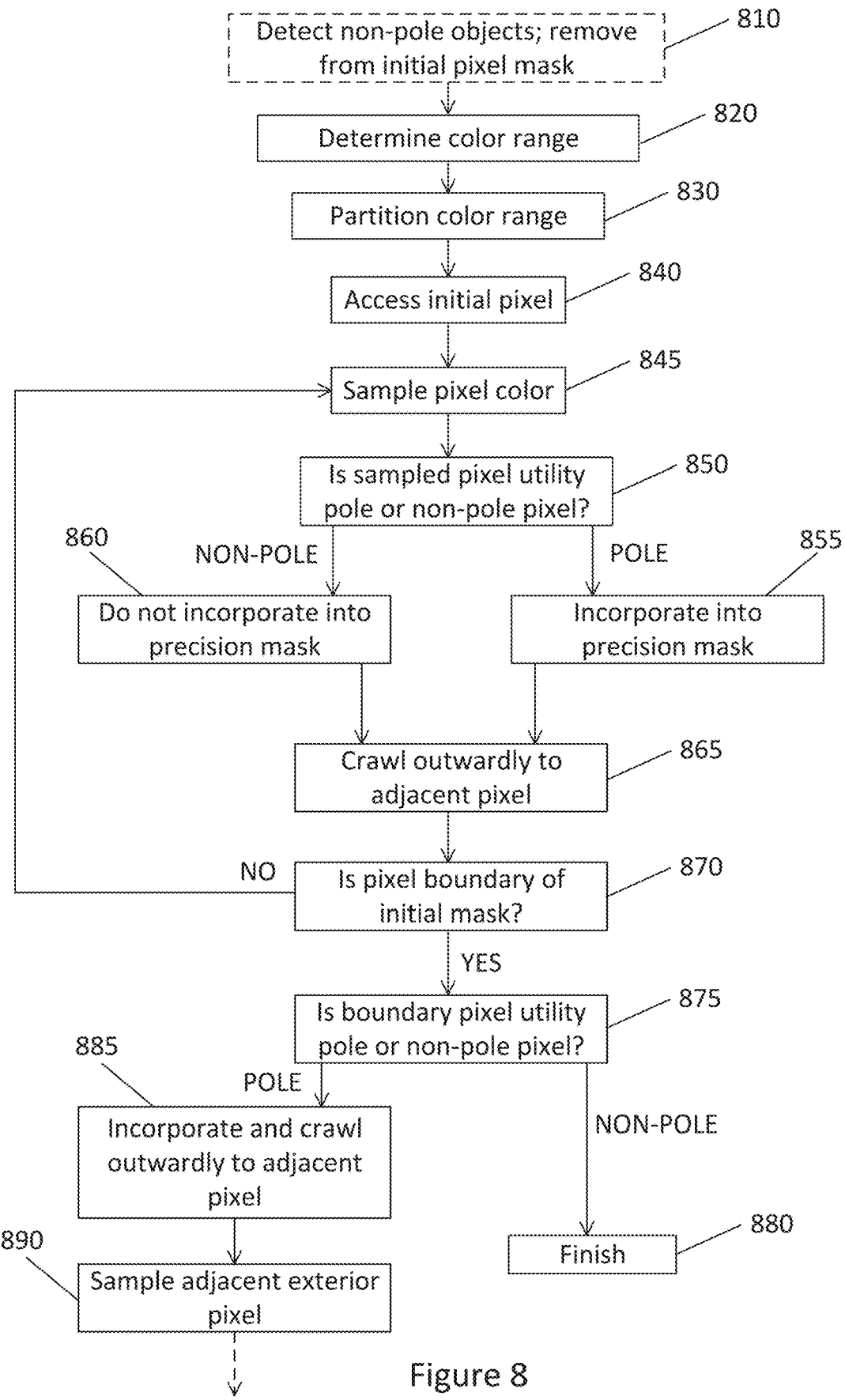
FIG. 8 depicts an example of a method of generating a precision mask.

FIG. 8 depicts an example of a method of generating a precision mask from an initial intermediate pixel mask. Non-pole objects within the intermediate mask may optionally be detected and removed at 810 if this has not already been done, as described above. A color range is then created at 820 by sampling the color of each pixel within the initial mask (although only a subset of pixels may be sampled in other examples). The intermediate mask includes background pixels and utility pole pixels, so the corresponding color space of the color range therefore includes background pixels and utility pole pixels.

The color space can be partitioned at 830 so that clusters corresponding to the background pixels and utility pole pixels are identified, as has been described above. Other methods for identifying the color ranges of the background pixels and utility pole pixels that are described above can also or alternatively be used.

Once the color space has been partitioned (if applicable) so that the background pixels and utility pixels have been identified, the pixels within the intermediate mask are processed. The processing begins at 840 with an initial pixel that is preferably at or near the center of the initial intermediate pixel mask. The color of the pixel is sampled at 845 and a check is made at 850 to determine whether the pixel is a utility pole pixel or a non-pole pixel on the basis of the color range. The sampled pixel is included into the precision mask at 855 if it is determined to be a utility pole pixel. It is otherwise excluded from the precision mask at 860 if it is determined to be a non-pole pixel.

The crawling process continues outwardly to an adjacent pixel at 865. A check is made to determine whether the pixel is a boundary of the initial pixel mask at 870. If the pixel is not part of the boundary of the initial mask, the color of the pixel is sampled at 845 and the process repeats. If the pixel is part of the boundary of the initial mask, a check is made at 875 as to whether the boundary pixel is a utility pole pixel or is a non-pole pixel (e.g. based on the color of the pixel and the color range). If the boundary pixel is a non-pole pixel, then the process ends at 880.

Conversely, if the boundary pixel is determined to be a utility pole pixel, it is incorporated into the precision mask and an adjacent exterior pixel is crawled to at 885. The adjacent exterior pixel is then sampled at 890 and the crawling process continues as if the initial pixel mask is a small initial pixel mask. In other words, the pixel processing proceeds substantially along the lines of 410 earlier.

All of the pixels within the initial mask are therefore processed and are included or excluded from the precision mask on the basis of their color with reference to the color range, as has been described above for large initial masks. However, when the crawling process reaches the outermost edge of the initial mask that still contains utility pole pixels (e.g. the edge closest to 780 in FIG. 7), the crawling process extends outwardly from the edge of the initial mask. Adjacent chains of pixels that are also found to be utility pole pixels are then added to the precision mask as they are processed. This part of the pixel processing is therefore substantially similar to the pixel crawling process described in relation to small initial masks.

In this way, the pixel processing utilizes elements from the processes described in relation to both 'large' initial masks and 'small' initial masks. The end result is a precision mask of the utility pole that is derived from an initial intermediate mask that contains some background pixels and only a subset of the utility pole pixels.

The pixel processing described above also does not necessarily need to start from the interior of the initial mask and work outwardly towards the boundary of the initial mask. The process could begin at the outer border of the initial mask. In this case, pixels would be crawled both inwardly of the edge of the initial mask (to capture utility pole pixels within the initial mask and exclude background pixels within the initial mask) and also outwardly from the edge of the initial mask (to capture adjacent utility pole pixels that were not captured by the initial mask.)

The example method depicted in FIG. 8—and other example methods for processing pixels in intermediate masks—can also be used when the characteristics of the initial mask are unknown (in other words, if it is unknown whether the initial mask is a small mask, a large mask, or an intermediate mask.) If the initial mask is a small mask, then the initial mask will be crawled through using an approach for small masks when the method reaches 875. If the initial mask is a large mask, then the crawling process will end at 875 once all boundary pixels of the initial mask have been sampled.

Precision Mask Accuracy

The applicant has found that precision masks as described herein can increase the accuracy of measurements taken from the corresponding digital images of the utility pole. For example, accurately identifying the top and bottom of a utility pole within a digital image can be useful for making further measurements of the utility pole. The accuracy of this identification depends at least partly on the accuracy of the pixel mask for the utility pole.

Figure 9:
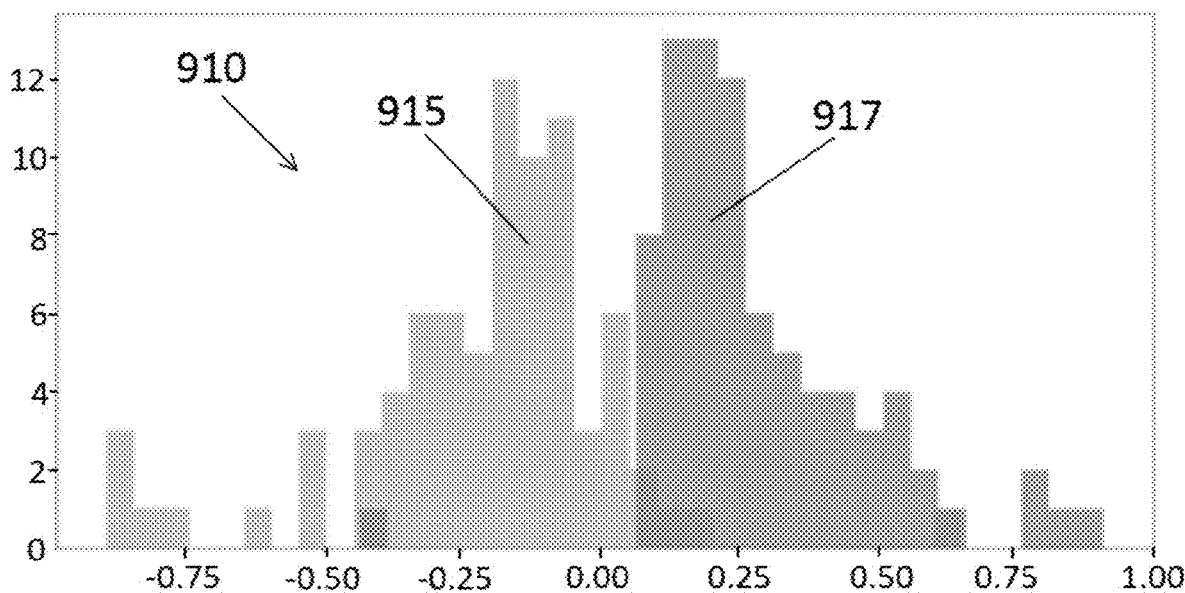
FIG. 9 illustrates the effect of a precision mask on measurement accuracy.
Figure 9:
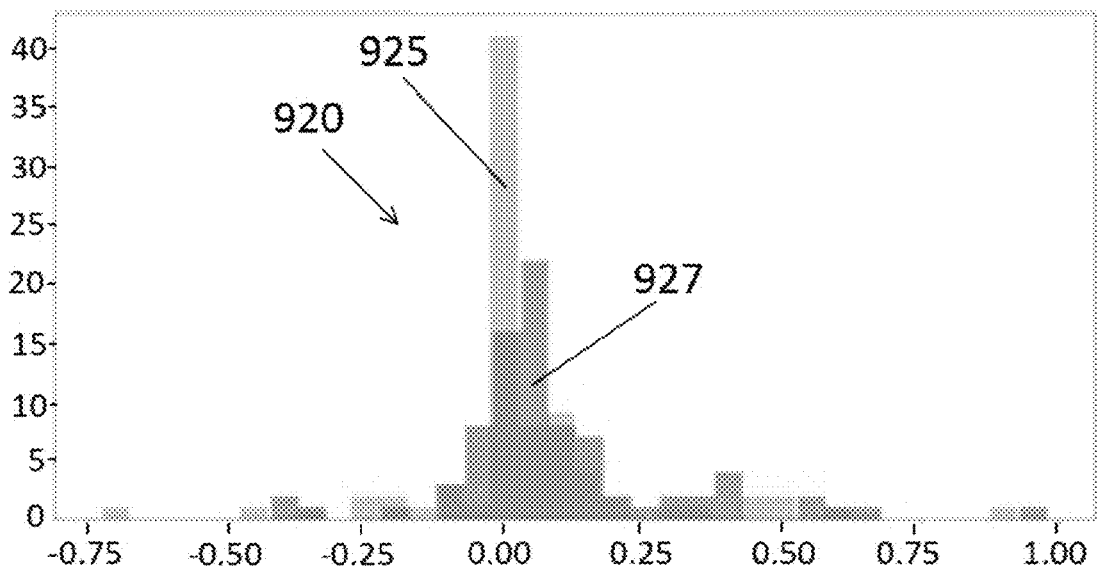

FIG. 9 depicts the impact of precision masks in the accurate identification of the top and bottom of a utility pole. Histogram 910 shows errors for a number of measured pole tips 915 and pole bases 917 that have been made using initial pixel masks. The ground truth measurements used to determine the magnitude of the error have been made using a human operator. The pale tip is generally measured to be less than the ground truth tip and has a mean error of −0.21 meters. Conversely, the pole base is generally measured to be greater than the ground truth base and has a mean error of +0.29 meters. The difference in sign between the average tip error and average base error causes the two separation between the two peaks within the histogram 910.

Conversely, histogram 920 shows errors for a number of measured pole tips 925 and pole bases 927 that have been made using precision masks as described herein. It can be seen that the errors in measured tip and measured base are symmetric about the zero-error point of the histogram. The measured bases have a mean error of +0.09 meters whilst the measured tip has a mean error of +0.04 m. The use of precision masks therefore has a significant effect on the accuracy of the identified utility pole tip and base.

Non-Pole Hardware

The methods described so far have been used to produce precision masks for utility poles. However, this is not intended as a limitation on any of the methods described herein. It can often be desirable to create precision masks for pole hardware, such as transformers and insulators. In these examples, the methods used may be substantially the same as described above, except with non-pole hardware as the 'target' for the precision mask.

For example, a digital image may be segmented or otherwise analyzed to create an initial mask for a target piece of pole hardware, such as a transformer. Any non-hardware pixels—including utility pole pixels—may be removed from the digital image and/or the initial mask using object detection, as described herein in relation to the removal of known objects from the initial mask of a utility pole.

A color range may then be populated from the initial mask of the pole hardware. The color range can be populated using any of the methods described above. A pre-determined color range can also or alternatively be provided.

Pixels can then be processed using any of the ways described above to create a precision mask for the target pole hardware. Pixels may be included or excluded from the precision mask when compared against the color range corresponding to pole hardware pixels and/or identified background pixels.

3D Overlays

Utility poles (and pole hardware) can generally be divided into different classes. The class of a utility pole will usually dictate the pole's dimensions, such as its length and/or minimum width or diameter, as well as other characteristics of the utility pole (such as the material of the utility pole).

If the class of a given utility pole is known, then the dimensions of the pole that are determined by the pole class can be inferred with a high degree of accuracy. These known dimensions can then be used as a reference to measure other dimensions of the utility pole or its hardware. Reference dimensions of this kind can be useful when making measurements of utility poles from digital images.

However, in most cases, the class of a utility pole that is depicted in a digital image is not initially known. Other information (e.g. LiDAR data) is typically used to first determine an initial reference dimension or scale for the image and for subsequent measurements of the utility pole. The class of the utility pole is then determined from the various measurements of the utility pole that are taken using the initial reference.

Figure 10:
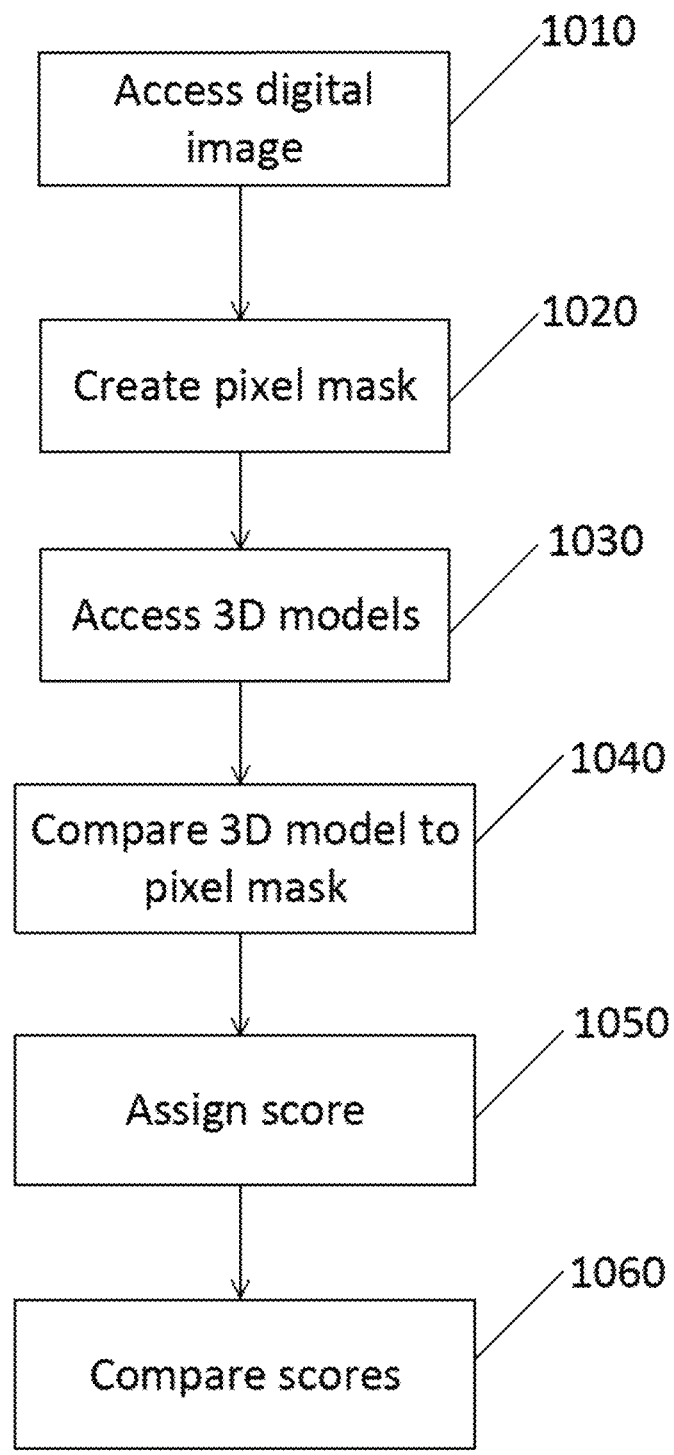
FIG. 10 depicts an example of a method for determining a class of a utility pole.

FIG. 10 depicts an example of a method of determining the class of a utility pole depicted in a digital image. Knowledge of the class of the utility pole allows for accurate photogrammetric measurements without necessarily requiring an initial reference dimension or scale.

A digital image depicting the utility pole is access at 1010 and a pixel mask of the utility pole is created at 1020. The pixel mask is preferably a precision mask described above as this can give very high levels of accuracy, although less accurate pixel masks may be used if a corresponding decrease in accuracy is acceptable.

A plurality of 3D models of utility poles is accessed at 1030. Each 3D model represents a utility pole from a given class of utility poles. The relative dimensions of each 3D model are at least partially dictated by its corresponding class.

Each 3D model is then compared against the pixel mask of the utility pole at 1040 to determine a best fit from the library of 3D models. This can involve scaling the 3D model and aligning the model (or its 2D silhouette) with a corresponding portion of the pixel mask. The model (or its silhouette) is then overlaid with the pixel mask and the overlap between the two is assessed to determine the fit of the model. The top of the utility pole is typically chosen for alignment because it is usually visible in the digital image, whilst the bottom of the utility pole can be embedded in the ground and may not be visible in the digital image. The model can alternatively be aligned with the point at which the utility pole meets the ground whilst taking account of the fact that some length of utility pole will be embedded in the ground.

The utility pole and its pixel mask will typically have some degree of tilt or pitch in the digital image as it is unlikely to be perfectly normal with respect to the ground. Furthermore, the digital image will often be taken with some amount of pitch, roll, and/or yaw with respect to gravity. These angular differences mean that the pixel mask will generally not align with a perfectly upright silhouette from a 3D model, even if the 3D model represents the actual class of the depicted utility pole.

These angular variations can be accounted for by rotating each 3D model about different axes while maintaining the alignment between the top of the 3D model and the top of the pixel mask. The silhouette of the 3D model can be compared against the pixel mask at each angular position to determine the match between the 3D model and the pixel mask. The angular resolution of the different rotations can depend on the application of the method. In some examples, a comparison may be made for every 0.1° of rotation about an axis. The view of the 3D model as it would appear to the camera that originally acquired the digital image can also be calculated if the attributes or characteristics of the camera are known.

Each 3D model is then scored against the pixel mask at 1050. The score can be based on the overlap between the 3D model at a given angular orientation and the 2D pixel mask. The score may be expressed as one or more Booleans. For example, Booleans can be defined for whether the left edges line up, whether the right edges line up, and whether the bottoms line up. In other examples, the score may alternatively (or additionally) have a non-Boolean component. For example, a quantitative score could be attributed to the degree of alignment between an edge of the pixel mask and a corresponding edge of the silhouette. The quantitative score could be determined using an error function which is based on the pixels of the edge of the silhouette (for example, their distance from the pixels of the edge of the pixel mask.)

The different classes of utility poles are iterated through in this manner until they have been scored against the pixel mask. The scores are then compared to at 960 determine the most likely class of the utility pole depicted within the image.

The most likely class can then be determined by comparing the scores assigned to each class. For example, if the score is an error function then the lowest-scoring class will be selected. If the score is based on the similarity of the class then the highest class will be selected.

This process allows for high accuracy measurements of the utility pole in two different ways. At a first level, a reference dimension can be established in the digital image using information from the utility pole class that has been identified. This reference can then be used to photogrammetrically measure the utility pole from the 2D digital image of the utility pole.

At a second level, the utility pole in the digital image can be measured by taking measurements between points on the corresponding 3D model of the utility pole. This is possible because the process of determining the most likely utility pole class involves the superposition and alignment of an accurate 3D model of the utility pole over the top of the 2D image of the utility pole. Each pixel of the pixel mask of the utility pole then correlates to a point on the superimposed and aligned 3D model of the utility pole. Measuring the distance between two pixels of the pixel mask is then equivalent to measuring the distance between the two corresponding points on the 3D model. The accuracy of these measurements can then be limited by the accuracy of the 3D model, the accuracy of the pixel mask, and the pixel resolution of the digital image. The applicant has found that the accuracy of the 3D model and pixel mask can both be very high, particularly if a precision mask as described herein is employed.

Predicting Utility Pole Height from Metadata

The applicant has found that a utility pole's height can be accurately predicted by using a digital image depicting the utility pole and associated metadata as inputs to a trained machine learning model. The metadata may be pixel data (such as a precision mask as described herein) that can be derived entirely from the digital image or may be non-pixel data.

Figure 11:
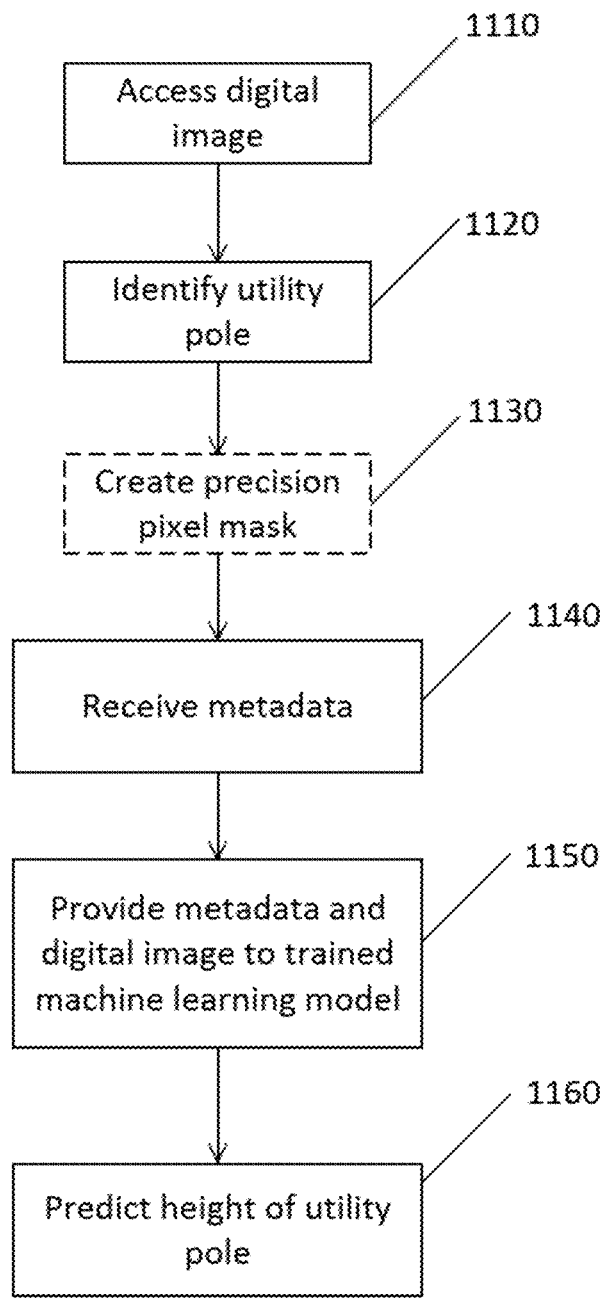
FIG. 11 is an example of a method for predicting the height of a utility pole.

FIG. 11 depicts an example of a method of predicting the height of a utility pole. A digital image depicting the utility pole is accessed at 1110 and the utility pole within the image is identified (e.g. segmented) at 1120. A precision mask as described herein can optionally be created for the utility pole at 1130. Metadata is accessed at 1140. The digital image and metadata are then provided to a trained machine learning model at 1150 which then outputs the predicted height of the utility pole.

The trained machine learning model used at 1150 can be a neural network, it can be trained using a labelled dataset of digital images that depict utility poles which have a known height. Other kinds of trained machine learning models can also be used.

Figure 12:
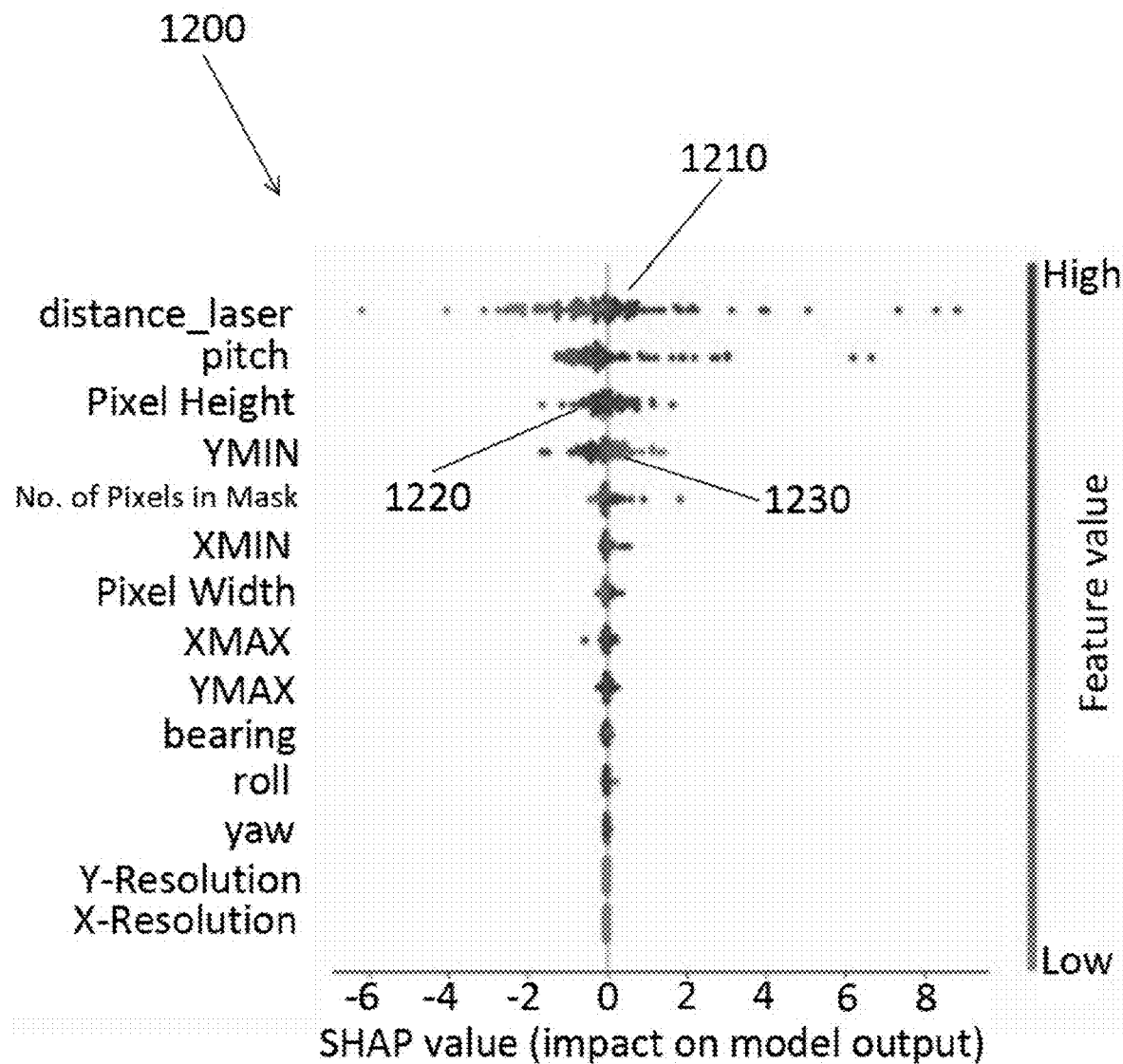
FIG. 12 shows an SHAP graph.

FIG. 12 depicts a SHAT graph 1200 demonstrating the significance of different kinds of metadata on the accuracy of the predicted height during training of the machine learning model. The metadata used for training and/or prediction can include measurements that have been taken in the field by an operator, such as the distance from the utility pole to the camera that acquired the digital image (shown by 1210 in the figure). Other metadata may be derived entirely from the digital image, such as pixel data for the utility pole. For example, the total height 1220 of the pixel mask for the utility pole and total number of pixels 1230 within the pixel mask can be used to accurately predict the height of the utility pole. A precision mask as described herein is preferably used in order to increase the accuracy of the predicted height. Multiple kinds of metadata may be used during training and/or for prediction.

Figure 13:
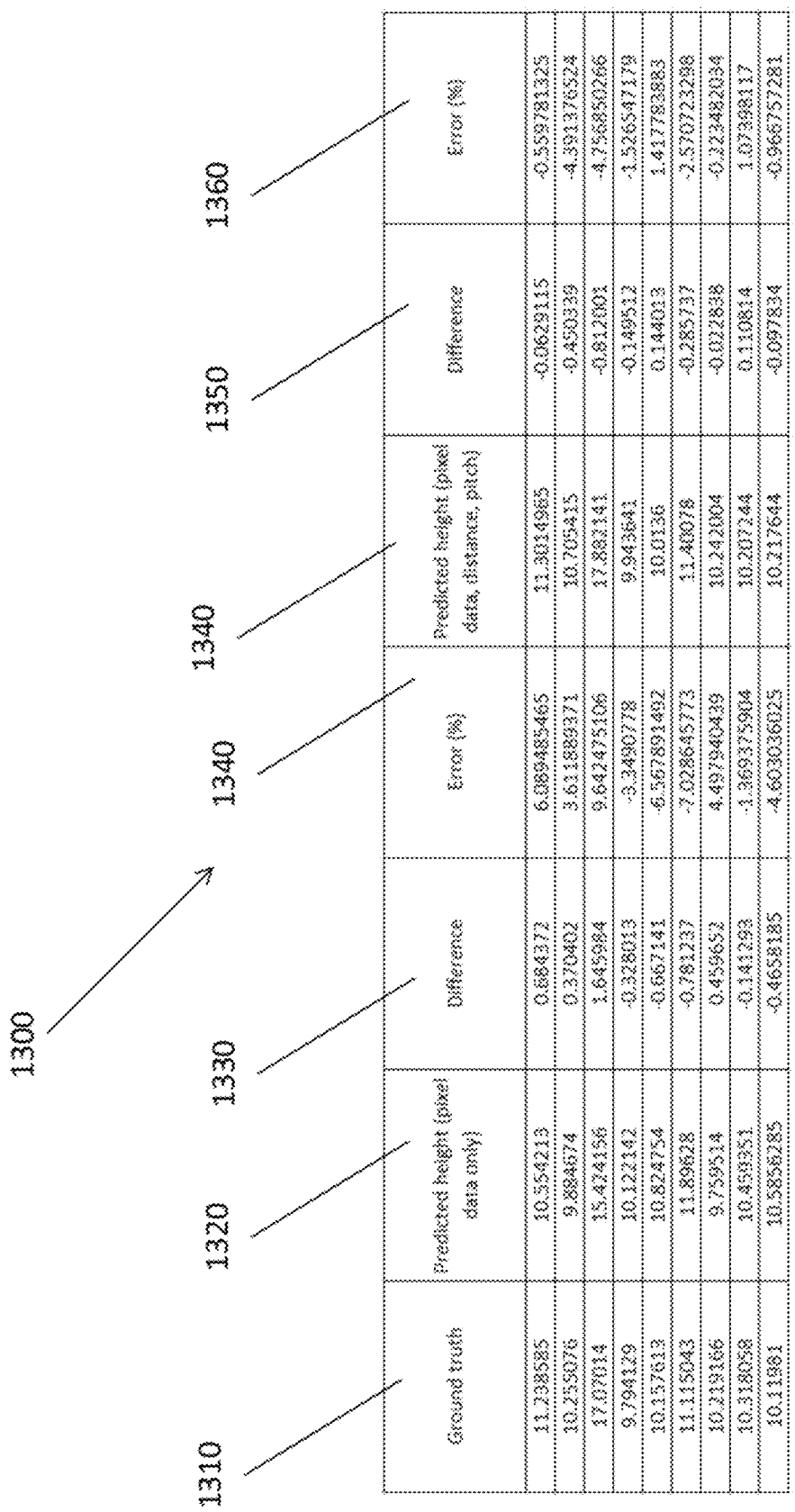
FIG. 13 shows several predicted heights of utility poles.

FIG. 13 shows a table 1300 demonstrating the accuracy of a number of predictions using metadata. Column 1310 depicts the ground truth height of a number of utility poles. Column 1320 depicts the predicted height of the utility pole made using only pixel data as metadata. A precision mask as described herein has been used as pixel data for each utility pole. Column 1330 shows the difference between the prediction and the ground truth in units of meters and column 1340 shows the error as a percentage. It can be seen that the error of these predicted measurements is typically around 7% or less.

Column 1350 shows the predicted height using the same pixel data in combination with the measured distance from the utility pole to the camera (used to acquire each respective digital image) and the pitch of the camera as metadata. Column 1340 shows the error between the prediction and the ground truth in units of meters. The accuracy is improved and the error is less than 5%. In some cases, the error can be below 1%.

This demonstrates the effectiveness of using metadata to predict the height of a utility pole that is depicted in a digital image. This can allow for automated and accurate measurements and analyses of digital images of utility poles.

The computing device used to execute the methods disclosed herein may comprise an electronic computing device. For example, the electronic computing device may be a tablet, a phone, a personal computer, a server, or a similar device. The methods described herein may be implemented using a general purpose computing system or electronic computing device specifically programmed to perform the described steps. Alternatively, the methods described herein may be implemented using a specific computer system such as a graphical analysis computer, an image intelligence computer, etc., where the computer has been specifically adapted to perform the described steps on specific data captured from an environment associated with a particular field.

The electronic computing device may be a single computer, a single server, or have the functionality performed by, a server apparatus distributed across multiple server components connected via a communications network (either a private LTA, WAN or public internet). The computer or server apparatus may include a number of individual components including, but not limited to, one or more microprocessors, a memory (e.g. a volatile memory such as a RAM) for the loading of executable instructions, the executable instructions defining the functionality the server apparatus carries out under control of the processor. There may also be an input/output module allowing the server to communicate over a communications network. A user interface can be provided for user control and may comprise, for example, computing peripheral devices such as display monitors, computer keyboards and the like. Server apparatus also comprises a database, for storing patient specific data, statistical anatomical data, and models for various available implants.

Figure 14:
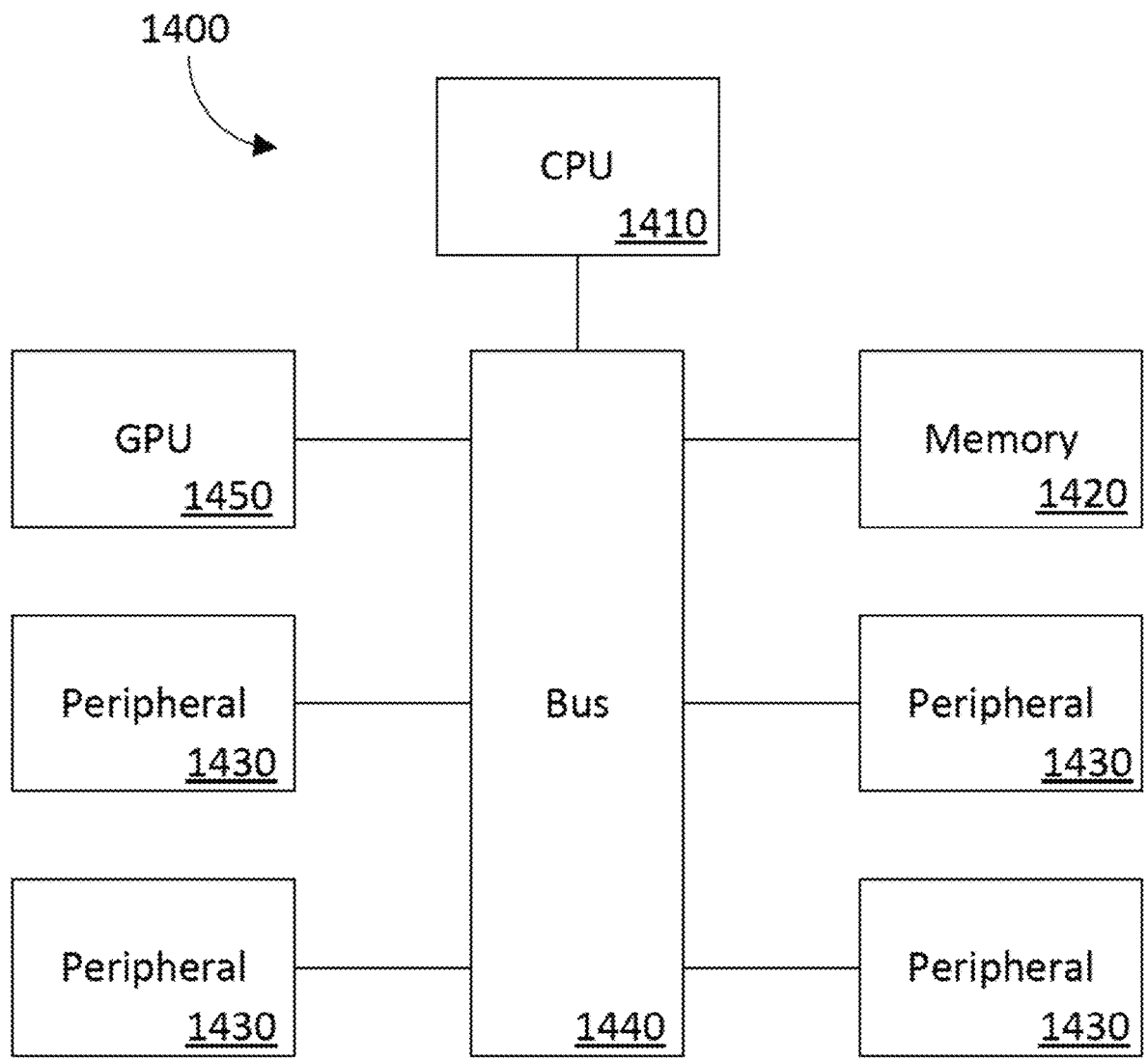
FIG. 14 shows an example computing device.

FIG. 14 shows a block diagram of an example computing device 1400. The device 1400 comprises a CPU (central processing unit) 1410, a main memory 1420, one or more peripherals 1430, and a GPU (graphics processing unit) 1450. The CPU 1410, main memory 1420, peripherals 1430, and GPU 1450 are connected by a bus 1440. In the case of a PCIe (PCI Express) topology, the bus 1440 includes a root complex, and each of the peripherals 1430 and the GPU 1450 are PCie endpoints. The GPU 1450 can communicate with the peripherals 1430 directly via the bus 1440. In some cases, more than one CPU 1410 and/or more than one GPU 1450 is provided.

The peripherals 1430 may include the drives in the array, storage controllers (such as RAID controllers), network controllers (such as network interface cards), switches (such as PCIe switches configured to connect further peripherals), or any of a variety of devices.

The peripherals 1430 and the GPU 1450 may have access to the main memory 1420 via the bus 1440. Through DMA (direct memory access), this can allow the peripheral 1430 or the GPU 1450 to read data to and write data from the main memory. This may involve copying the data from main memory 1420 to a memory local to the peripheral 1430 or the GPU 1450.

The disclosed methods may be executed through software stored on non-transitory media that can run on any suitable device. In some examples, the software may be stored on a non-transitory computer-readable storage medium having instructions stored thereon that, when executed by one or more processors of a first computing device, performs a method for creating a precision mask for a utility pole and/or pole hardware depicted in a digital image, the method comprising: accessing a digital image comprising a plurality of pixels, detecting the utility pole and/or pole hardware within the digital image, creating an initial pixel mask for the utility pole and/or pole hardware, determining a color range, processing the plurality of pixels within the digital image, wherein: the color of each pixel is sampled, and each pixel is included or excluded from the precision mask based at least partially on its sampled color and the color range; and outputting the precision mask.

In some examples, software may be stored on a non-transitory computer-readable storage medium having instructions stored thereon that, when executed by one or more processors of a first computing device, performs a method of identifying a class of a utility pole and/or pole hardware depicted in a digital image, the method comprising: accessing the digital image, creating a pixel mask for the utility pole and/or pole hardware, accessing a plurality of 3D models, wherein each 3D model corresponds to a class of utility poles and/or pole hardware, comparing each 3D model with the pixel mask, and identifying the class of utility pole and/or pole hardware based at least partially on the comparison.

In some examples, software may be stored on a non-transitory computer-readable storage medium having instructions stored thereon that, when executed by one or more processors of a first computing device, performs a method predicting the height of a utility pole depicted in a digital image, the method comprising: accessing the digital image, identifying the utility pole within the digital image, receiving metadata, providing the metadata and digital image to a trained machine learning model, and predicting the height of the utility pole using the trained machine learning model.

While the present invention has been illustrated by the description of the examples thereof, and while the examples have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A method of predicting the height of a utility pole depicted in a digital image, the method comprising:
   accessing the digital image,
   identifying the utility pole within the digital image,
   receiving metadata,
   providing the metadata and digital image to a trained machine learning model, and
   predicting the height of the utility pole using the trained machine learning model,
   wherein the metadata comprises pixel data of the utility pole, and
   wherein the pixel data comprises the height of a pixel mask for the utility pole.

2. A method of predicting the height of a utility pole depicted in a digital image, the method comprising:
   accessing the digital image,
   identifying the utility pole within the digital image,
   receiving metadata,
   providing the metadata and digital image to a trained machine learning model, and
   predicting the height of the utility pole using the trained machine learning model,
   wherein the metadata comprises pixel data of the utility pole, and
   wherein the pixel data comprises the total number of pixels of a pixel mask for the utility pole.

3. The method of claim 1, wherein the metadata comprises non-pixel data.

4. The method of claim 3, wherein the metadata comprises the distance from the utility pole to a camera used to acquire the digital image.

5. The method of claim 3, wherein the metadata comprises a pitch.

6. The method of claim 1, wherein the pixel data comprises the total number of pixels of a pixel mask for the utility pole.

7. The method of claim 1, wherein the pixel data comprises a precision mask for the utility pole.

8. The method of claim 7, wherein the metadata comprises non-pixel data.

9. The method of claim 8, wherein the metadata comprises the distance from the utility pole to a camera used to acquire the digital image.

10. The method of claim 8, wherein the metadata comprises a pitch.

11. The method of claim 6, wherein the metadata comprises non-pixel data.

12. The method of claim 11, wherein the metadata comprises the distance from the utility pole to a camera used to acquire the digital image.

13. The method of claim 11, wherein the metadata comprises a pitch.

14. The method of claim 7, wherein the pixel data comprises the total number of pixels of a pixel mask for the utility pole.

15. The method of claim 14, wherein the metadata comprises non-pixel data.

16. The method of claim 15, wherein the metadata comprises the distance from the utility pole to a camera used to acquire the digital image.

17. The method of claim 15, wherein the metadata comprises a pitch.

18. The method of claim 2, wherein the pixel data comprises a precision mask for the utility pole.

19. The method of claim 2, wherein the metadata comprises non-pixel data.

20. The method of claim 1, wherein the metadata comprises the distance from the utility pole to a camera used to acquire the digital image.

21. The method of claim 1, wherein the metadata comprises a pitch.

22. The method of claim 18, wherein the metadata comprises non-pixel data.

23. The method of claim 22, wherein the metadata comprises the distance from the utility pole to a camera used to acquire the digital image.

24. The method of claim 22, wherein the metadata comprises a pitch.

* * * * *